358-86. OR 2,921,127 SR

SEARCH ROOM

Jan. 12, 1960 D. Q. FULLER 2,921,127

TELEVISION DISTRIBUTION SYSTEM

Filed Jan. 25, 1954

T5002 Rm

Inventor
Dennis Q. Fuller
By
Holcombe, Wetherill & Brisebois Attorneys 2,921,127

TELEVISION DISTRIBUTION SYSTEM

Dennis Quintrell Fuller, Cambridge, England, assignor to Pye Limited, Cambridge, England, a British company Application January 25, 1954, Serial No. 405,705

Claims priority, application Great Britain January 26, 1953

3 Claims. (Cl. 178—6.8)

The present invention relates to a television distribution system, for distributing by a cable to one or more terminal stations, television signals received at a central distribution station, for example from the normal television broadcast service.

Usually the television sound is sent over the distribution cable by the ordinary method used for distribution sound programmes and the video and synchronising signals are sent over the cable by means of a carrier modulated with the standard television waveform. For reasons of cable attenuation this carrier is usually at a lower frequency than the normal television radio transmission. In order to simplify the receiver at a connecting point on the distribution cable, hereinafter referred to as a terminal station, the signal is, on an average, at a higher level than that encountered in normal television receivers.

It is an object of the present invention to provide an improved system for the distribution of the television waveform, and to remove the functions of synchronising signal separation and scanning waveform generation from the terminal stations to the distribution station, whereby the terminal apparatus may be simplified.

From one aspect therefore, the invention comprises a television distribution system, for distributing television signals from a distribution station at which the complete television waveform is received over a distribution cable to a terminal station, wherein the synchronising signals are separated from the video signals at the distribution station and are used to produce line and frame scanning waveforms at said distribution station, said scanning waveforms being fed over the distribution cable to the terminal station where the said scanning waveforms are applied to the deflecting means associated with the cathode ray tube or other picture reproducing device at the terminal station.

The video signals and scanning waveforms can be distributed to the terminal stations over the same or separate cables.

According to a feature of the invention, the video signals are distributed over the cable in the usual way as a carrier modulated with the video signals, and the scanning waveforms are distributed over the same cable by using them to modulate one or more sub-carriers which in turn is/are used to modulate the picture carrier. Preferably the line and frame sawtooth scanning waveforms are mixed to produce a composite scanning waveform which is used to modulate a single sub-carrier which in turn modulates the picture carrier.

At the terminal stations the scanning waveform subcarrier is separated and the line and frame scanning waveforms are applied to scanning amplifiers driving the deflecting means associated with the cathode ray tube at the terminal station.

Thus the main station separates the picture components from the synchronising signals and the line and frame synchronising signals from each other. The line and frame scanning waveforms, usually sawtooth waveforms, are also produced at the main station. The picture components and scanning waveforms are transmitted over the cable as carriers modulated with double or single sidebands. Either amplitude or frequency modulation may be used as desired.

In order that the invention may be more fully understood an embodiment thereof will now be described with reference to the accompanying drawings in which.

With the arrangements according to the invention it is possible that undesirable combinations of frequencies could occur, giving rise to beat patterns on the picture received at a terminal station, and the system now to be described is designed to minimise these undesirable effects.

Figure 1:
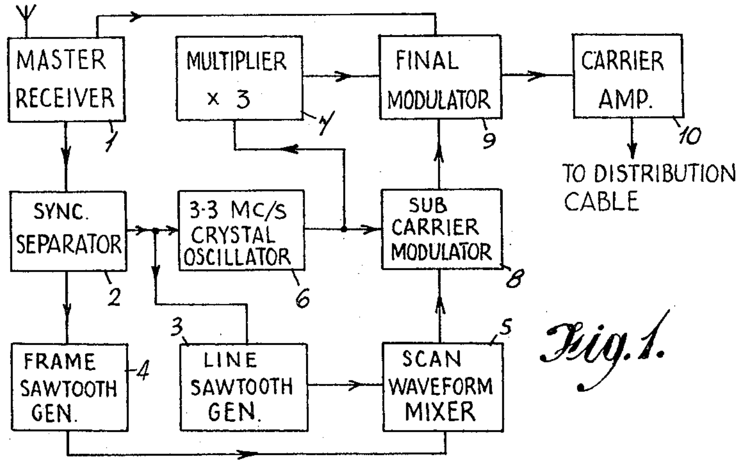
Figure 1 shows a block schematic diagram of the main distribution station.

Figure 1 shows a block schematic diagram for a complete main distribution station providing the complete signal for cable distribution. It is to be understood that the frequencies given are by way of illustration only.

Figure 2:
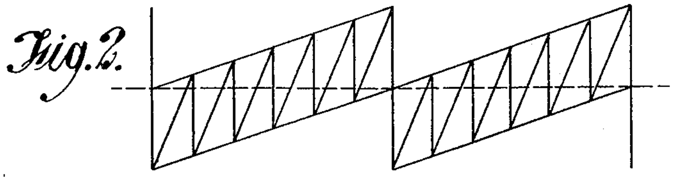
Figures 2 and 3 are waveform diagrams explaining the operation of the circuits of Figure 1.

The master receiver 1 receives the nomal television transmission and produces the conventional video waveform and also a separate synchronising wavetrain. As in a normal television receiver it can be fitted with A.G.C. and "black spotting" circuits if desired. The synchronising separator circuit 2 fed from the receiver 1 is also conventional, but preferably utilises flywheel synchronising circuits and pulse shaping circuits to ensure a good line and frame pulse waveform. The line and frame scan sawtooth generators 3 and 4 respectively, are driven by the synchronising impulses; from the synchronising separator 2. Advantageously, driven rather than triggered sawtooth generators are used, which gives a definite advantage in that the complete system is automatically synchronised and thus line or frame slip at any of the terminal points is avoided. The sawtooth generators preferably also contain efficient devices for control of linearity. The combined scan mixer 5, fed from the generators 3 and 4, serves to superimpose the line scan waveform on the frame scan waveform as shown in Fig. 2; in which the line scan waveform is represented for convenience as having 6 times the repetition frequency of the frame scan waveform. The combined scan waveform and the picture waveform from the receiver 1 are used to modulate a sub-carrier frequency and a carrier frequency respectively.

The generation of the carrier frequencies is important, since random differences in frequency between carrier and modulation components or carrier and sub-carrier can cause interference in the received picture. It has been shown that such forms of interference are less annoying if they are stationary with respect to the raster of the cathode ray tube screen and thus the subcarrier source is preferably a crystal controlled oscillator 6 working at a frequency which is roughly a multiple of the line scan frequency. This oscillator is related to the line scan by injection of line synchronising pulses in an appropriate manner; which has the effect of fixing the starting phase of the oscillator at each line pulse injection and, provided that the inherent stability of the oscillator is good, any pattern produced by interaction between this oscillator and other picture components is stationary. Alternatively, the sub-carrier can be obtained by direct multiplication up from the line frequency. In this case the crystal controlled oscillator is in effect replaced by a final subcarrier amplifier.

In order to prevent undesirable beats between harmonics of the sub-carrier and the main carrier, the main carrier is derived from the sub-carrier by frequency multiplication. In the multiplier circuit 7, the factor 3 is shown, but this is given merely as a convenient illustration and this factor, in combination with the crystal oscillator frequency, can be changed to give the appropriate carrier required.

The sub-carrier modulator 8, fed from the oscillator 6 and the mixer 5, is of conventional type. The modulated sub-carrier output from 8, together with the picture modulation from receiver 1 is impressed on the main carrier in the final modulator 9. After any necessary amplification, for example, by the amplifier 10, the complete transmission is fed to the cable distribution system.

Figure 3:
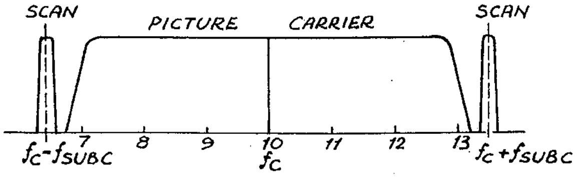

The sideband distribution will be as shown in Fig. 3, with the sub-carrier components associated with the scan waveforms lying just outside the upper limits of picture components; the separation necessary is determined by practical considerations of circuit design in the generating and terminal units.

Figure 4:
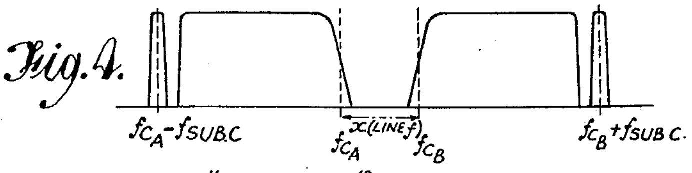
Figure 4 is a waveform diagram of a modified mode of operation and Figure 5 is a block schematic diagram of a terminal station.

It will be seen that the system as described, is readily applicable to a system for the transmission of two vision programmes, the same principle of frequency derivation being followed. Thus Fig. 4 shows the sideband distribution for a two programme system on single sidebands, the sub-carrier frequency being either derived from, or phase locked to, the line frequency. The carrier for programme A ($fc_a$), is derived from the sub-carrier by multiplication, while the carrier for the second programme B ($fc_b$), is derived from $fc_a$ by beating it with an appropriate multiple of the line frequency and selecting the upper beat. The full advantage of this method is only realised when the two programme sources have a common line frequency; otherwise the two carriers should be treated as separate applications of the same principle, each being derived from its own line frequency.

Figure 5:
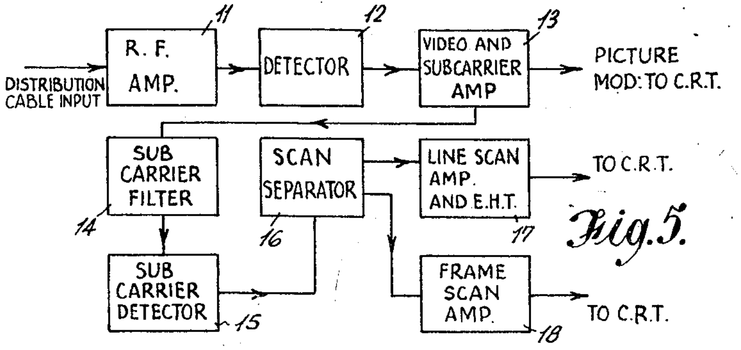

The terminal station equipment is shown in Fig. 5 which is a block schematic diagram for a typical terminal unit operating on a single vision programme system according to the invention.

The signal from the distribution cable is fed through the R.F. amplifier 11, and the detector 12 to the amplifier 13 which amplifies the video signal and sub-carrier, the video output from amplifier 13 is fed to modulate the cathode ray tube, whilst the sub-carrier output is fed through the filter 14 to the sub-carrier detector 15. The output from detector 15 is fed to the scan separator 16 which separates the line scan saw-tooth waveform from the frame scan sawtooth waveform, the two separated sawtooth waveforms being applied to the line and frame scan amplifiers 17 and 18 respectively. The outputs of these amplifiers are applied to deflect the beam of the cathode ray tube and produce the scanning raster.

The scan amplifiers 17 and 18 are of the driven type and consequently inherently locked to the master scan generators 3 and 4 at the main distribution station. Thus synchronisation interlace, linearity and amplitude are all to a large extent controllable from the main station with consequent improvement in the general performance of the system.

The arrangement according to the invention thus enables the time base generators at the terminal units to be dispensed with, thus simplifying the equipment at the terminal station. Furthermore, the use of a sub-carrier to carry the scan waveforms over the distribution cable enables the scan waveform to be carried on the same cable as the video signal.

Whilst a particular embodiment has been described it will be understood that various modifications may be made without departing from the scope of the invention. For example, instead of feeding the scanning waveforms over the distribution cable on a sub-carrier modulated on the carrier carrying the video signal, these waveforms could be fed along a separate conductor in the distribution cable.

I claim:

1. A system for distributing television signals, comprising picture signals interspersed with line and frame synchronizing signals, consisting of a distribution station comprising means for receiving said television signals, means for separating the synchronizing signals from the picture signals, a line frequency scanning waveform generator, a frame frequency scanning waveform generator, means for controlling said line and frame frequency scanning waveform generators from said synchronizing signals, a sub-carrier frequency generator working at substantially a multiple of the line scan frequency, means for controlling the phase of the sub-carrier frequency generator from said synchronizing pulses derived from the received television signals, means for mixing the line and frame scanning waveforms, means for modulating the mixed line and frame scanning waveforms on to said sub-carrier frequency, means for generating a carrier frequency by multiplying the sub-carrier frequency, means for modulating the modulated sub-carrier frequency on to said carrier frequency, means for modulating the picture signals on to said carrier frequency, a distribution cable, means for feeding the modulated carrier frequency to said distribution cable, and a terminal station connected to said distribution cable and consisting of means for detecting the picture signals, a filter for filtering the sub-carrier modulated with the line and frame scanning waveforms, means for detecting the line and frame scanning waveforms, separating means for separating the line and frame scanning waveforms from each other and means for feeding the line and frame scanning waveforms and picture signals to a cathode ray tube.

2. A system for distributing television signals, comprising picture signals interpersed with line and frame synchronizing signals, consisting of a distribution station comprising means for receiving said television signals, means for separating the synchronizing signals from the picture signals, a line frequency scanning waveform generator, a frame frequency scanning waveform generator, means for controlling said line and frame frequency scanning waveform generators from said synchronizing signals, a crystal-controlled sub-carrier frequency generator working at substantially a multiple of the line scan frequency, means for controlling the phase of the sub-carrier frequency generator from said line synchronizing pulses derived from the received television signals, means for mixing the line and frame scanning waveforms, means for modulating the mixed line and frame scanning waveforms on to said sub-carrier frequency, means for generating a carrier frequency by multiplying the sub-carrier frequency, means for modulating the modulated sub-carrier frequency on to said carrier frequency, means for modulating the picture signals on to said carrier frequency, distribution cable means, means for feeding the modulated carrier frequency to said distribution cable means, and a plurality of terminal stations connected to said distribution cable means, each terminal station consisting of means for detecting the picture signals, a filter for filtering the sub-carrier modulated with the line and frame scanning waveforms, means for detecting the line and frame scanning waveforms, separating means for separating the line and frame scanning waveforms from each other and means for feeding the line and frame scanning waveforms and picture signals to a cathode ray tube.

3. In a television distribution system for distributing television signals comprising picture signals interspersed with line and frame synchronizing signals, a distribution station comprising means for receiving said television signals, means for separating the synchronizing signals from the picture signals, a line frequency scanning waveform generator, a frame frequency scanning waveform generator, means for controlling said line and frame frequency scanning waveform generators from said synchronizing signals, a sub-carrier frequency generator working at substantially a multiple of the line scan frequency, means for controlling the phase of the sub-carrier frequency generator from said line synchronising pulses derived from the received television signals, means for mixing the line and frame scanning waveforms, means for modulating the mixed line and frame scanning waveforms on to said sub-carrier frequency, means for generating a carrier frequency by multiplying the sub-carrier frequency and means for modulating the picture signals and the modulated sub-carrier frequency on to said carrier frequency.

References Cited in the file of this patent

UNITED STATES PATENTS

| | | |
|---|---|---|
| 2,227,822 | Campbell | Jan. 7, 1941 |
| 2,236,501 | Goldsmith | Apr. 1, 1941 |
| 2,241,586 | Dorsman | May 13, 1941 |
| 2,343,561 | Loughren | Mar. 7, 1944 |
| 2,369,783 | Homrighous | Feb. 20, 1945 |